United States Patent
Wiesemann

[11] Patent Number: 5,993,651
[45] Date of Patent: Nov. 30, 1999

[54] WATER INFLUENT PARTICLE REMOVING APPARATUS

[76] Inventor: Bruce O. Wiesemann, 10388 Longwood Dr., Largo, Fla. 33773

[21] Appl. No.: 09/065,950

[22] Filed: Apr. 24, 1998

[51] Int. Cl.$^6$ ............................ E02B 5/08; B01D 33/056; B01D 36/02
[52] U.S. Cl. ..................... 210/155; 210/158; 210/160; 210/162; 210/209; 210/219; 210/197; 210/400; 210/393; 210/413
[58] Field of Search ........................ 210/158, 159, 210/160, 155, 162, 209, 219, 197, 400, 401, 391, 393, 413

[56] References Cited

U.S. PATENT DOCUMENTS

| | | |
|---|---|---|
| Re. 32,135 | 5/1986 | Creps et al. . |
| 1,411,945 | 4/1922 | Wallene . |
| 1,716,376 | 6/1929 | Geiger . |
| 2,525,516 | 10/1950 | Bergmann . |
| 2,899,062 | 8/1959 | Heacock . |
| 3,706,378 | 12/1972 | Markwick . |
| 3,802,565 | 4/1974 | Hughes . |
| 3,870,641 | 3/1975 | Pierson . |
| 4,008,158 | 2/1977 | Davis . |
| 4,377,480 | 3/1983 | Pierson . |
| 4,421,645 | 12/1983 | Creps et al. . |
| 4,446,023 | 5/1984 | Pierson . |
| 4,472,279 | 9/1984 | Pierson . |
| 4,597,864 | 7/1986 | Wiesemann . |
| 4,614,583 | 9/1986 | Hawkes . |
| 4,812,231 | 3/1989 | Wiesemann . |
| 5,019,258 | 5/1991 | Pierson . |
| 5,102,536 | 4/1992 | Wiesemann . |
| 5,366,626 | 11/1994 | Pierson . |
| 5,368,732 | 11/1994 | Pierson . |
| 5,798,039 | 8/1998 | Wiesemann . |

FOREIGN PATENT DOCUMENTS

| | | |
|---|---|---|
| 3-260210 | 11/1991 | Japan . |
| 846855 | 8/1960 | United Kingdom . |

*Primary Examiner*—Thomas M. Lithgow
*Attorney, Agent, or Firm*—Larson & Larson, P.A.; James E. Larson

[57] ABSTRACT

An endless screen lifts fecal matter and sewer influent debris from an influent channel. The endless screen is powered by an externally positioned air cylinder driving a pawl and rachet to move the screen in an elliptical path. A tank positioned below a top drop point for the screen receives the fecal matter and debris. A paddle mixer breaks up the fecal matter for return to the sewer channel and a conveyor picks up the debris and deposits it in a landfill receptacle.

14 Claims, 8 Drawing Sheets

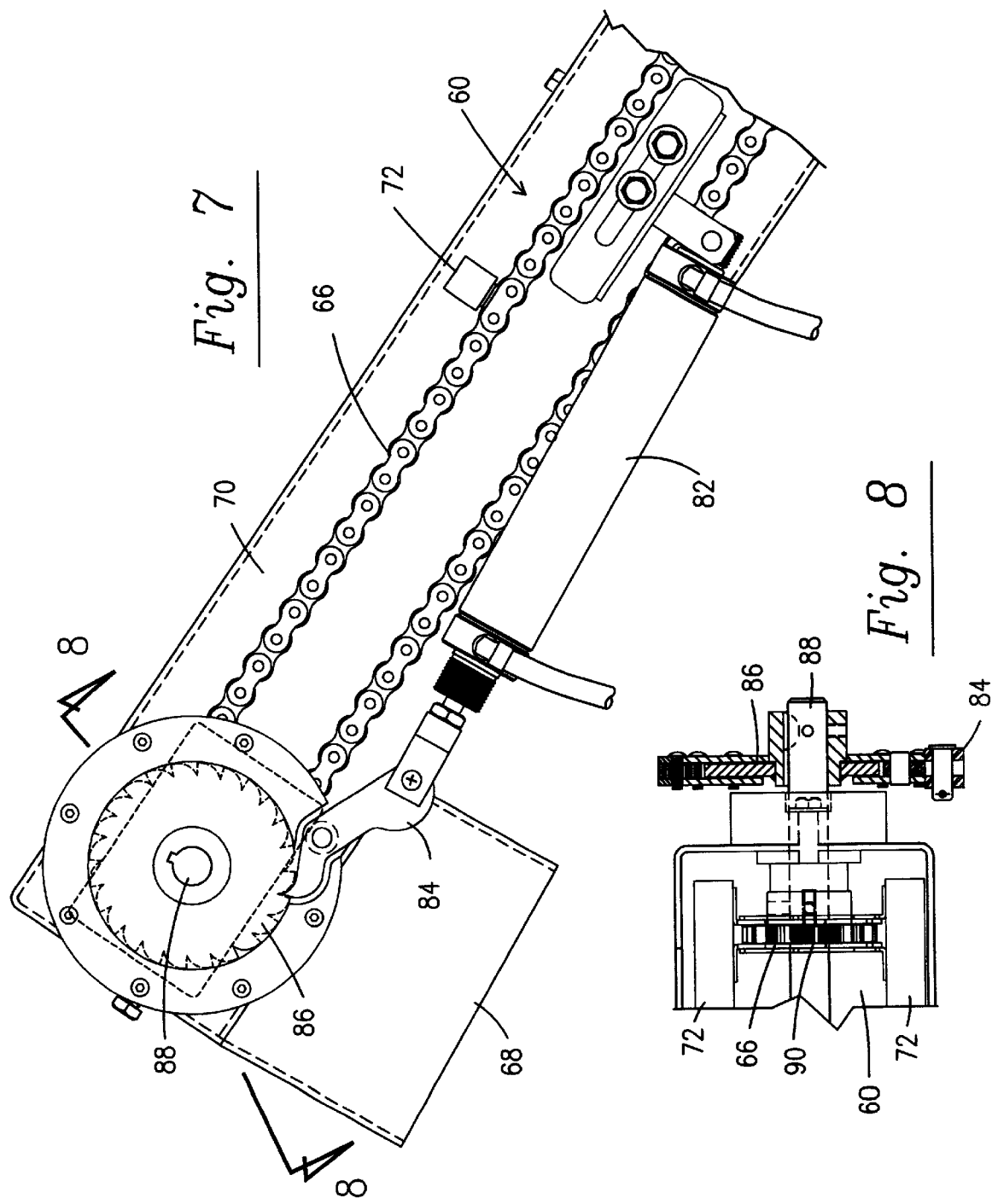

WATER INFLUENT PARTICLE REMOVING APPARATUS

BACKGROUND OF THE INVENTION

1. Field of the Invention.

The present invention relates to an apparatus for filtering particles from water. More particularly, it relates to an apparatus for removing debris from a water influent line employing a system reducing power consumption and providing an explosion proof environment.

2. Description of the Prior Art.

Different types of apparatus appear in the prior art as useful to remove particles in water influent lines. The prior art includes U.S. Pat. Nos. 5,102,536, 4,812,231 and 4,597,864 which describe a drum apparatus with a self-cleaning rotating fine polishing filter screen. Although these patents describe effective apparatus for separating debris from water influent lines, they require a significant amount of power for their operation. An improved influent water filter apparatus is needed that requires reduced amounts of power and operate in are explosion proof environment with low maintenance costs together with reliability of service.

SUMMARY OF THE INVENTION

This invention in combination provides a sewer influent channel mounted filter screen and screenings washer for reducing fecal matter and separating from the fecal matter inorganic solids, plastics, paper and cloth for later drying and disposal in a land fill. The invention includes an endless belt screen that lifts solids from the influent channel and agitates these solids in a tank to reduce fecal matter and separate such fecal matter from inorganics and other solids in the influent channel. The endless belt screen is driven by a pneumatic cylinder that causes a pawl and rachet to turn a shaft connected to the endless; belt screen.

An agitator driven by a pneumatic cylinder reduces the fecal matter in the tank. Thereafter, a dewatering conveyor, containing filtration screens and driven by a pneumatic cylinder actuating a pawl and rachet mechanism to turn a shaft connected to the filtration screens, lifts the accumulated solid materials out of the tank and deposits them in a receptacle for later land filling.

BRIEF DESCRIPTION OF THE DRAWINGS

The invention may be best understood by those having ordinary skill in the art by reference to the following detailed description when considered in conjunction with the accompanying drawings in which:

FIG. 7 is an enlarged view of the keyed drive sprocket.

FIG. 8 is a sectional view of the lifting mechanism and drive system along sight line 8—8 of FIG. 7.

DETAILED DESCRIPTION OF THE INVENTION

Figure 1:
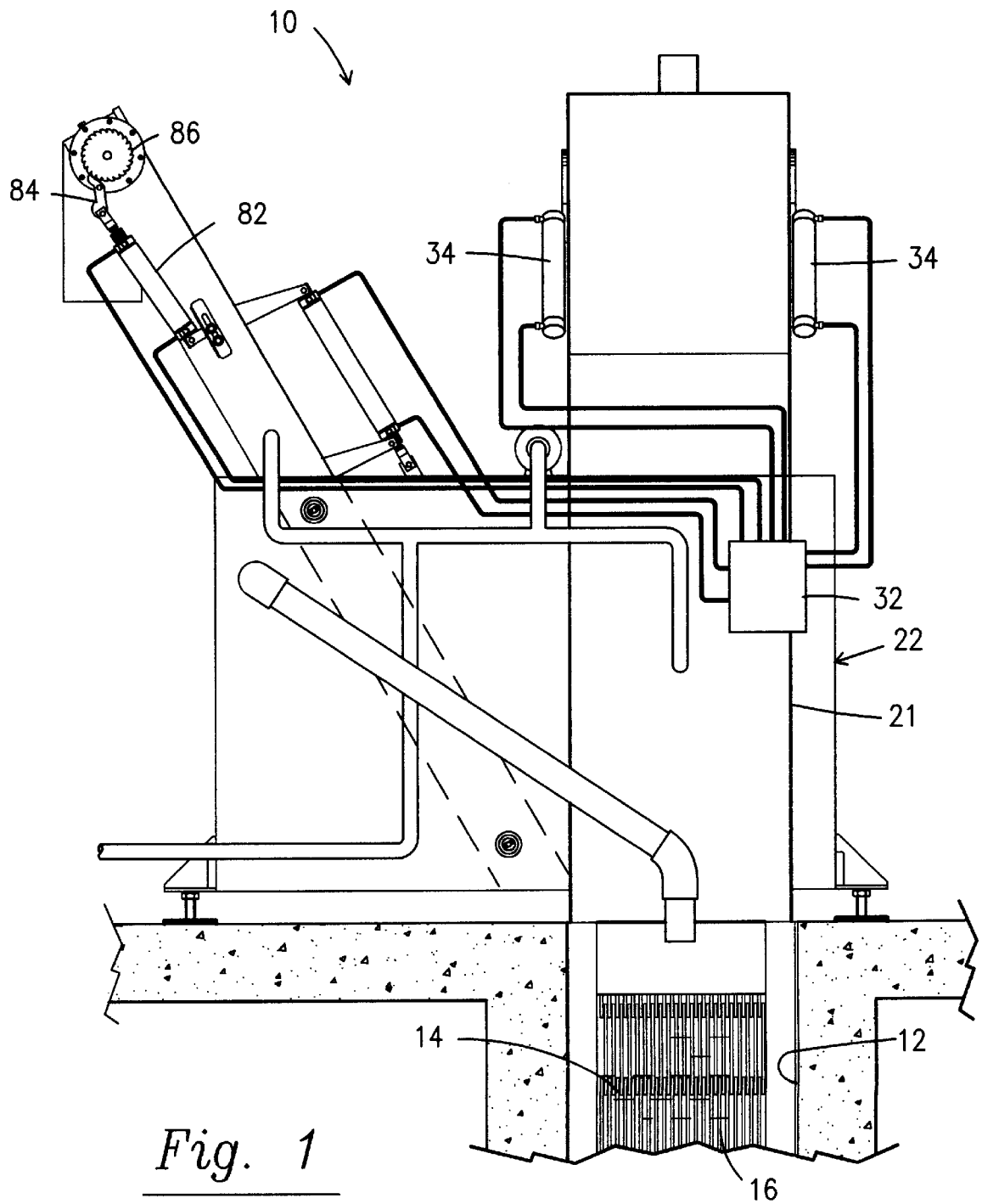
FIG. 1 is a side elevational view of the inventive water filter screen apparatus.
Figure 2:
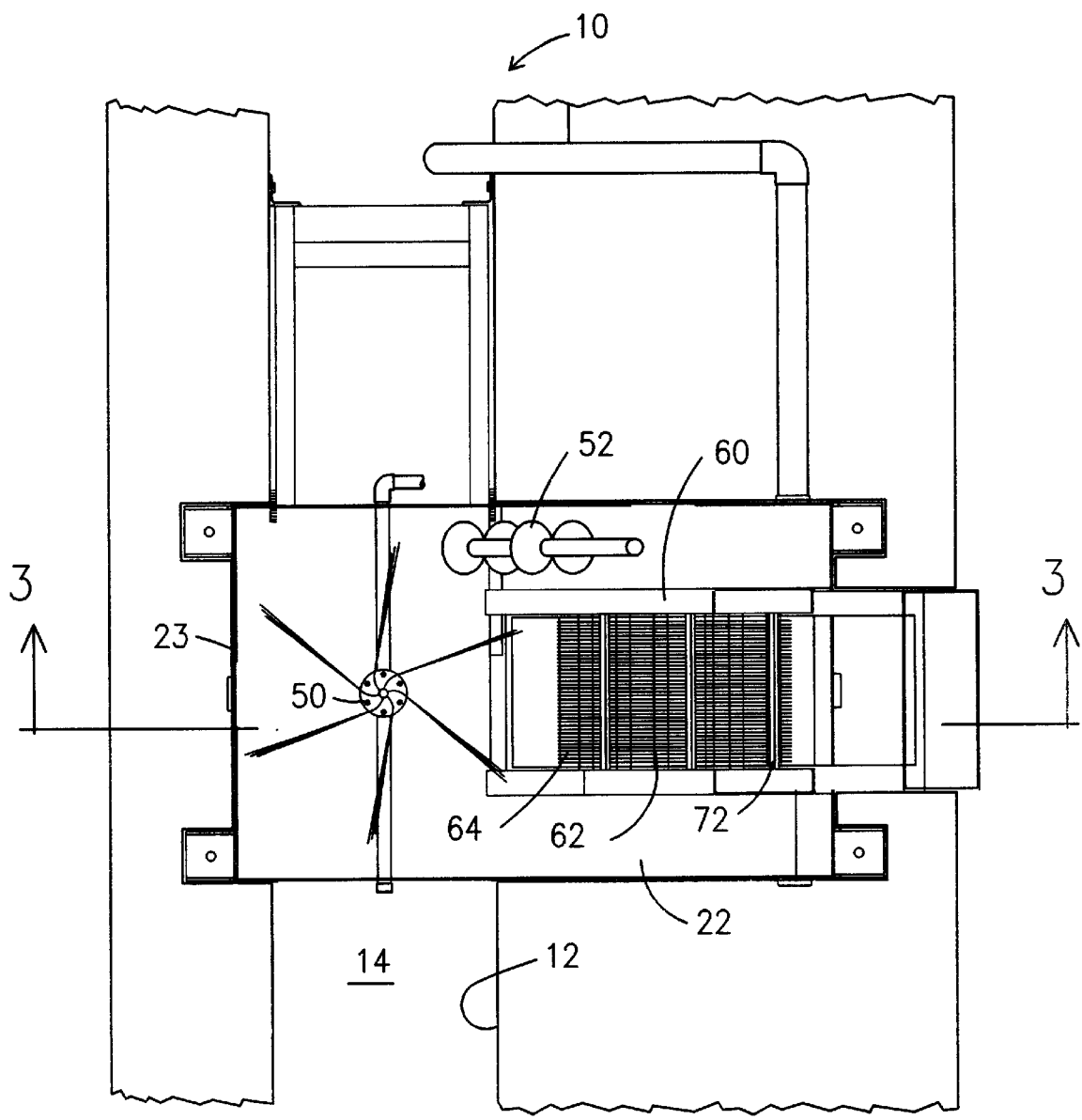
FIG. 2 is a partial top plan view of a portion of the inventive apparatus along sight line 2—2 of FIG. 3.

Throughout the following detailed description, the same reference numerals refer to the same elements in all figures.

The sewer influent water filter screen system 10 shown in FIGS. 1–4 receives an input flow from a sewer channel 12. The sewer influent 14 contains fecal matter, cloth of all types, paper and polymer material. These solids are lifted by screens 16 supported by an endless belt 18. A high pressure wash 30 sprays water on the sewer influent 14 which is deposited at the top 20 of its lift cycle into tank wash 22 within tank 23. Referring to FIG. 5, a pawl 36 and ratchet 38 mechanism incrementally moves the endless belt 18 through actuation by ark air cylinder 34. Power is derived from a control box 32 mounted on a side surface of a housing 21 for the endless belt 18.

Figure 4:
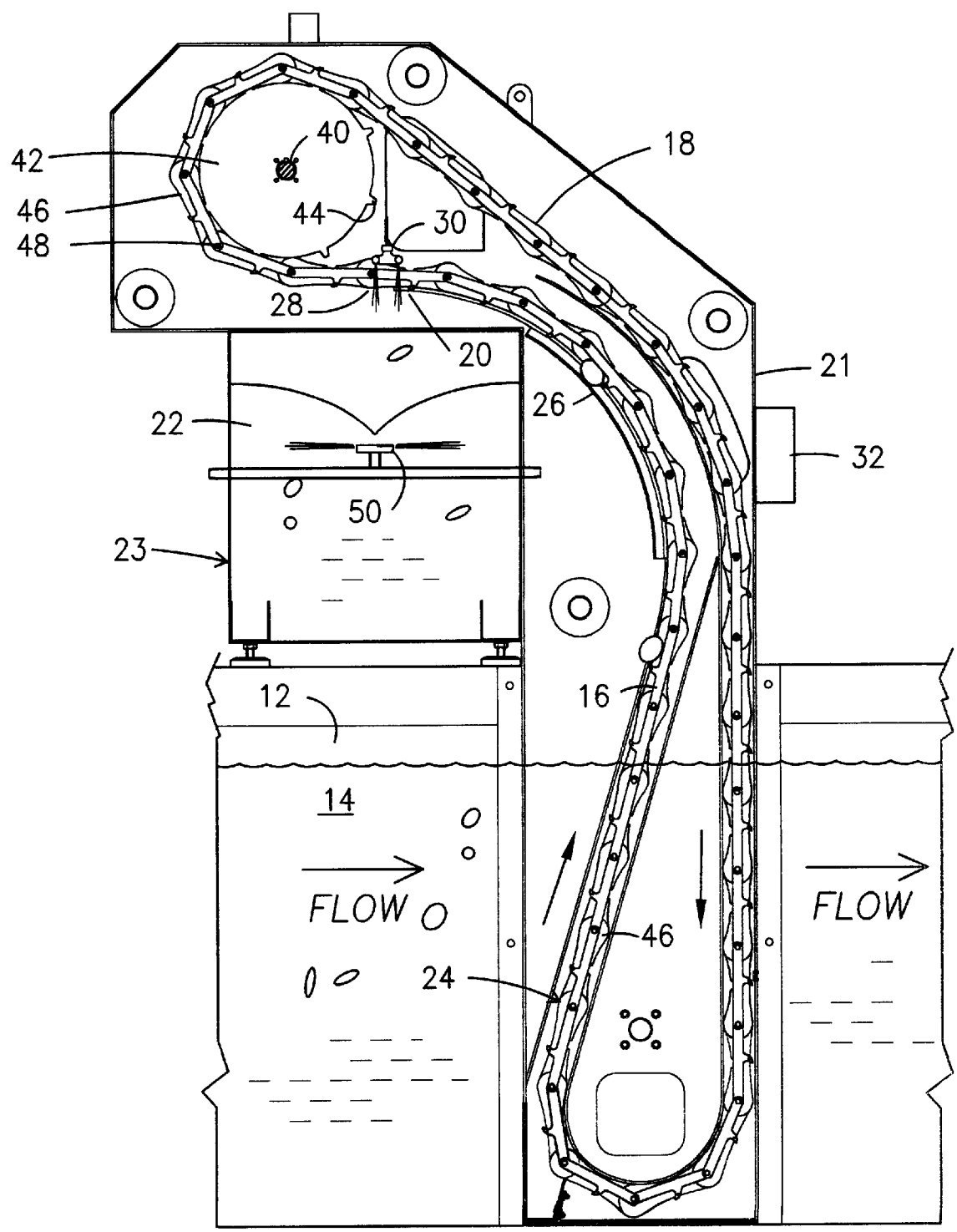
FIG. 4 is a detailed sectional view of the initial endless belt screen lifting debris into the tank from the influent channel along sight line 4—4 of FIG. 3.
Figure 5:
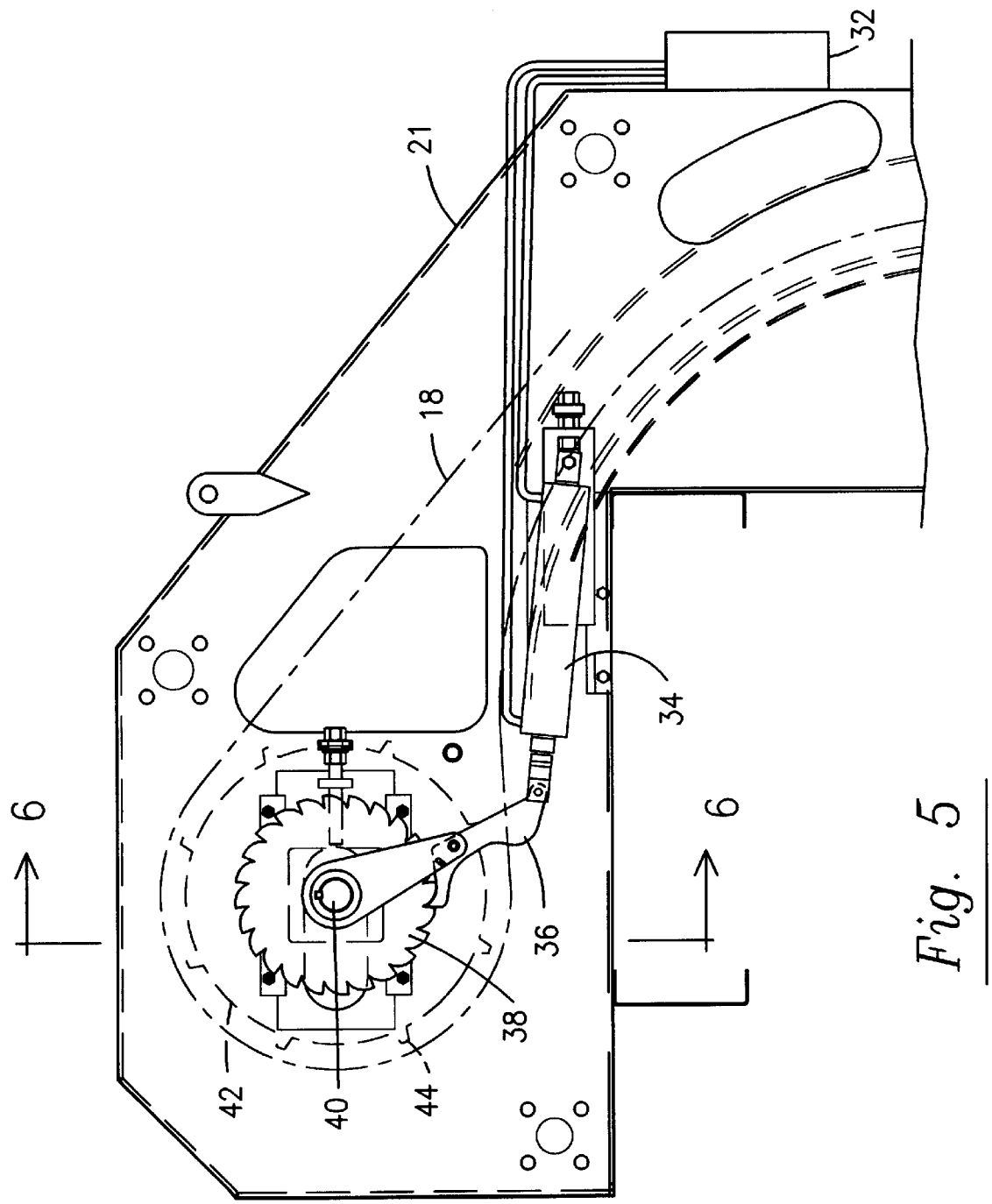
FIG. 5 is an elevational view of the drive mechanisms.
Figure 6:
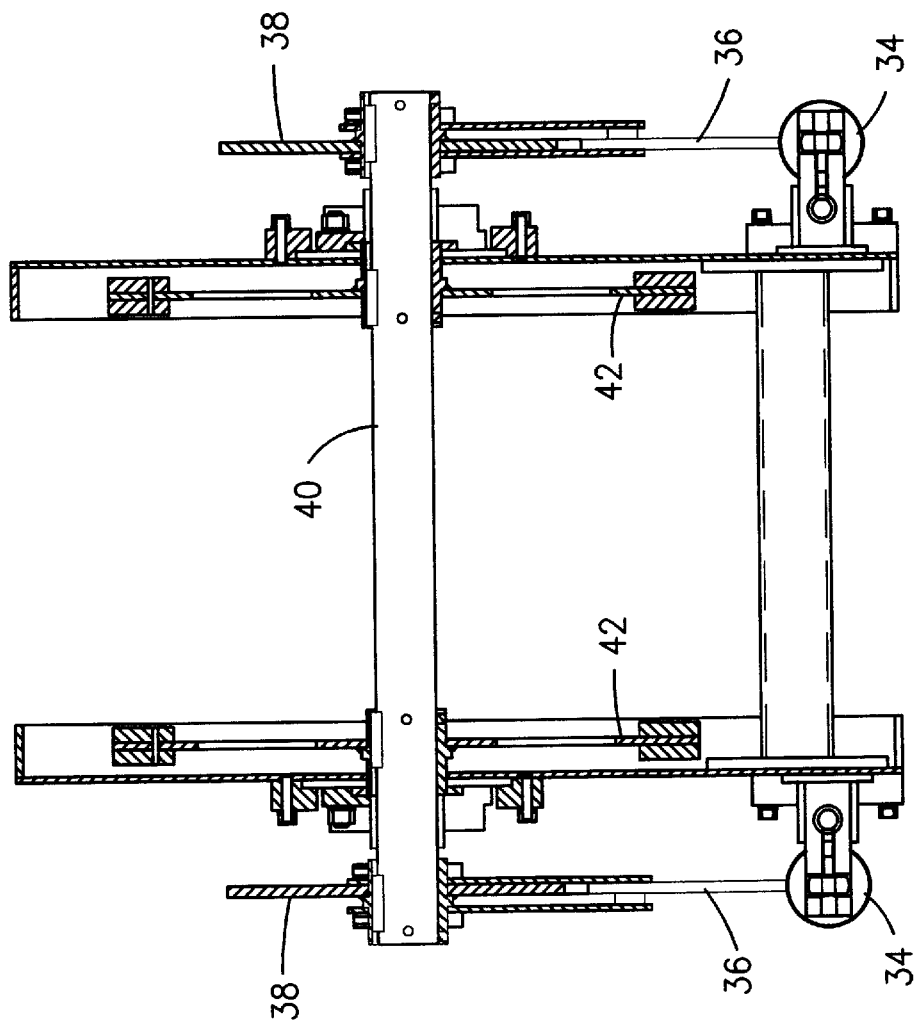
FIG. 6 is a sectional view of the air cylinder and pawl and rachet drive system along sight line 6—6 of FIG. 5.
Figure 9:
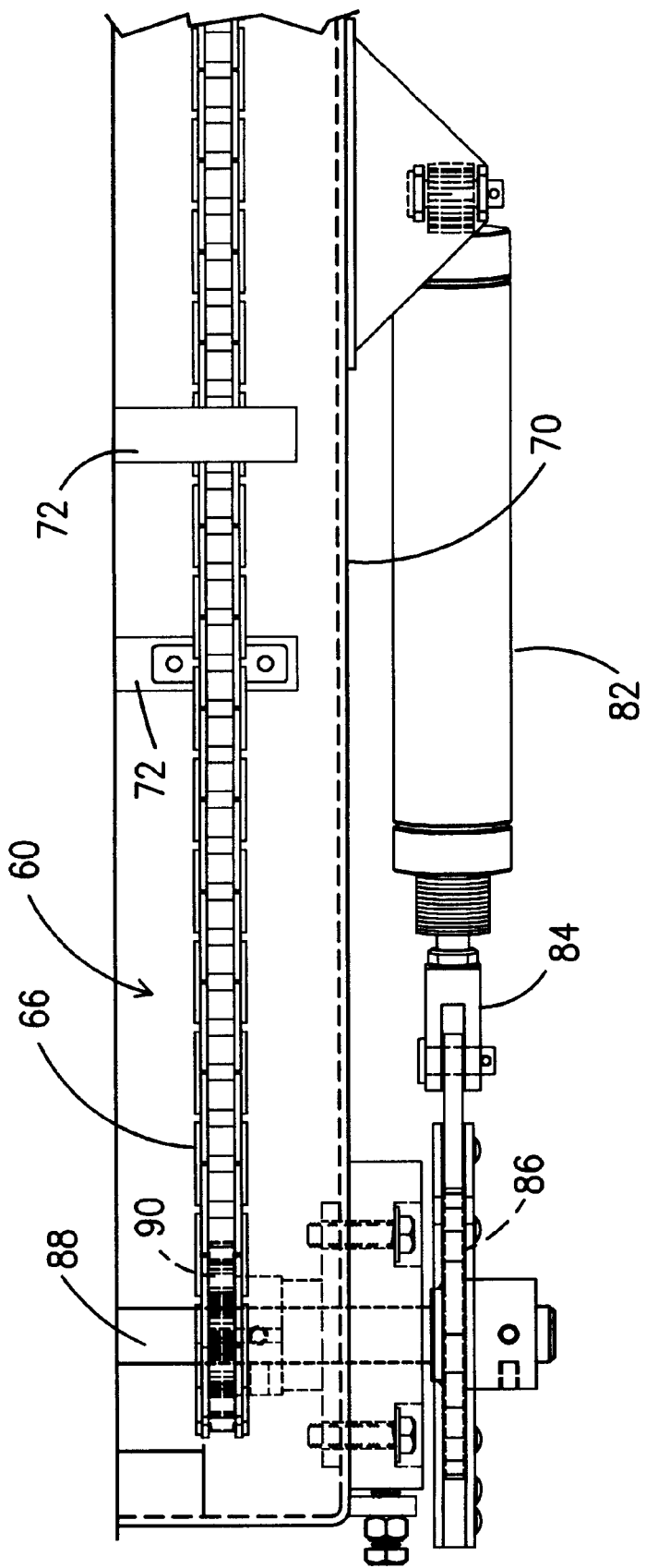
FIG. 9 is a top plan view of the drive mechanisms.

Referring to FIG. 4, the solids are retained on screens 16 mounted on the continuous screening grid 24. As the screens grid 24 approaches the point of unloading 20, it passes over a stainless steel drag plate 26 which prevents the accumulated solids from falling back into the influent channel. When the grid 24 clears the drag plate 26 at point 28 the solids begin to be washed from the grid 24 using a high pressure wash 30. When removed from the screening grid 24, the solids and spray wash are deposited into the screens tank wash 22.

The continuous filter screening grid 24 is driven by two pneumatic cylinders 34, shown in FIG. 5, to provide low grid speed as required for operation of the endless belt 18. The cylinders 34, having a torque of about 20 psi, cease operation when effort to move the screening grid 24 exceeds the available air pressure thereby preventing damage that could be caused by an overload condition. Even if one cylinder 34 is not functioning the remaining cylinder 34 of the pair as shown in FIG. 4 will continue to operate the screening grid 24.

The electrically operated control box 32 (see FIG. 5) provides for two screening grid speeds. When the cylinders 34 are operated in parallel a low screening grid speed is provided. When the cylinders 34 are operated alternatively, a speed of about two times the low screening grid speed is achieved. The higher speeds provide a more rapid removal of high concentrations of captured solids.

Referring to FIG. 5, the pneumatic cylinders 34 apply a linear motion to a pawl 36 and ratchet 38 which convert the linear motion of the cylinders 34 to curvilinear motion, thus rotating the screen grid drive axle 40 having two keyed drive sprockets 42 mounted at each end of the drive shaft 40. The drive sprockets 42 each have circumferentially positioned drive lugs 44 engaging the composite drive links 46 (see FIG. 4) mounted on each end of the axles 48 forming the basis for the screening grid 24. As shown, the drive sprockets 42 and the composite drive links 46 are designed so they do not contact the accumulated solids on the screens 16.

Referring to FIG. 4, the screening wash 22 drops into tank 23 mounted below the discharge point 28 and top of lift cycle 20 of the screening grid 24. The tank 23 is used to dissolve and break up fecal material for return to the influent channel while collecting the remaining solids for dewatering and disposal. Solid screens and spray wash water 22 from the filter screen grid 24 drop into a vortex (not shown) that exists in the tank 23. The agitation of the contents of the tank is created by a high pressure turbo washer 50 creating the vortex to spin and stratify the screens. A pneumatically activated paddle type agitator 52 (see FIG. 2) moves in an up and down direction to further mix and agitate the solid materials to ensure complete washing and separation of the fecal material from the remaining solids. Lighter fecal material remains in the upper water depths where it will be broken into smaller pieces or partially dissolved in the high velocity and spinning of the water. The heavier materials settle to the bottom of tank 23 where they are collected by a drag link dewatering conveyor 60 (FIG. 3) and lifted to a collection site.

Figure 3:
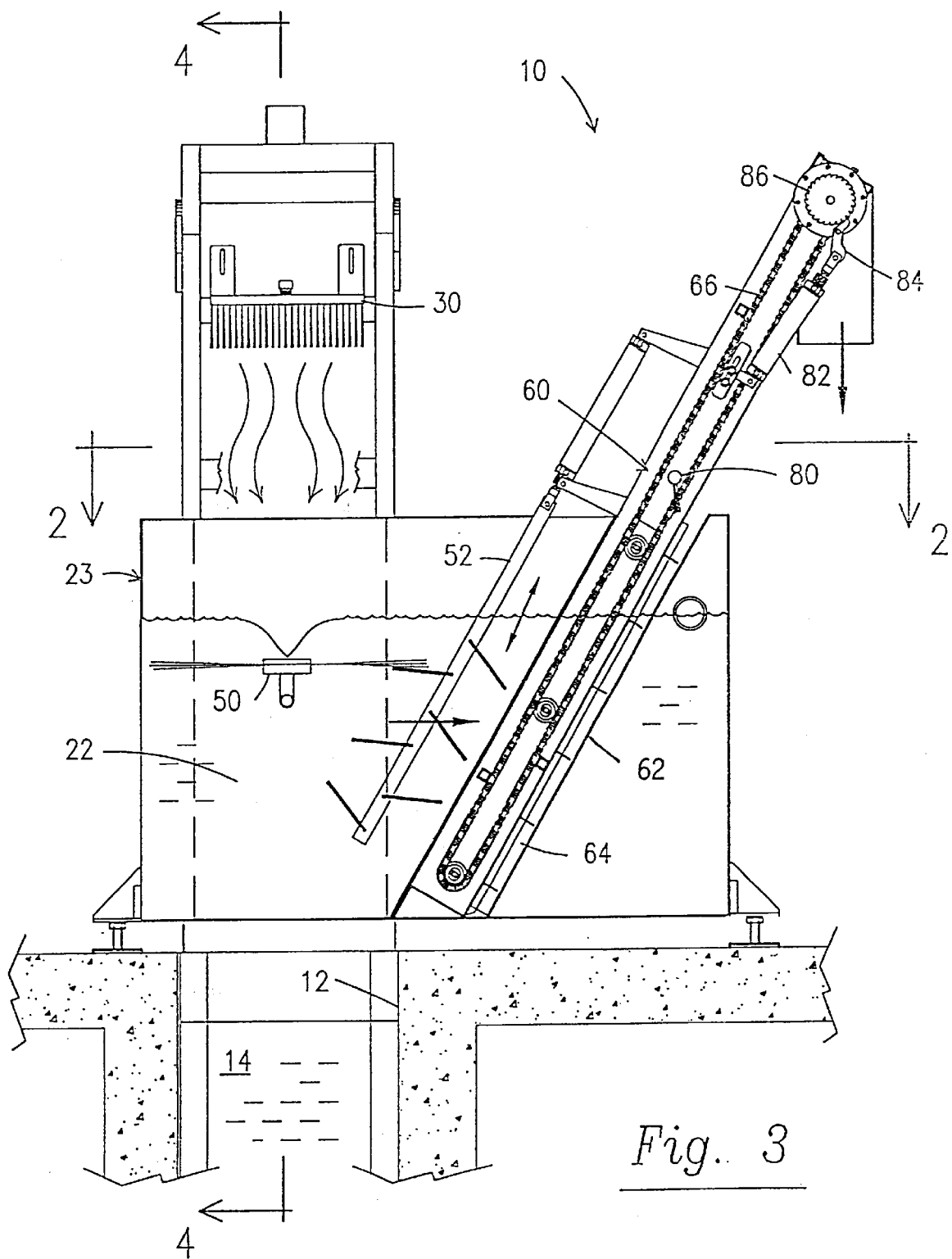
FIG. 3 is a partial sectional view along sight line 3—3 of FIG. 2.

Referring to FIG. 3, the reduced fecal material is filtered through a filtration screen 62 forming a bottom of a submerged portion 64 of the dewatering conveyor 60 and is allowed to exit through the screening washer overflow and then through pipe 58 (see FIG. 1) back to the exit end of channel 12 leading to a water treatment facility.

The dewatering conveyer 60 has a filtration screen 62 to permit reduced fecal materials and water to pass, but collects; the heavier materials accumulating in the screens wash 22 and lifts them via the drag link assembly 66 for disposal after exiting through top housing 68 (see FIG. 7). The chain drive conveyer 60 is protected from accumulating solids by a protective drive track 70 (see FIG. 7).

The dewatering conveyor 60 has drag links 72 serving to wipe the filtration grid, keeping the openings clean so that reduced fecal material and water can flow through it. A final spray nozzle 80 (see FIG. 3) washes the screened solids before they drop through an opening in housing 68.

Referring to FIGS. 7 and 8, the conveyor 60 drive system provides a low speed required for most applications. A pneumatic air cylinder 82 drives the conveyor 60. The cylinder 82 applies linear motion to a pawl 84 and ratchet 86 which converts the linear motion to curvilinear motion to rotate the conveyor 60 drive axle 88. The axle has keyed drive sprocket 90 mounted at each end of the shaft 88 and provides the motive force to the conveyor 60.

Optionally, a pneumatic odor control system can be mounted on the top of the initial screening housing 21 to pump ozone into the system to reduce odor. About 2.3 cu feet of ozone per hour is sufficient for odor control.

The filter screens 16 have openings of 2.5 mm to 38 mm depending on the solid materials desired to be removed.

The screening washer 24 and dewatering conveyor 60 in combination provide a compact design causing fecal material to be reduced and returned to the process, separates out solid material from a sewer influent, washes inorganics to reduce odor formation and dries the inorganics suitable for landfill disposal.

The maximum velocity of the screen elements is 4 ft/second. The materials used are stainless steel with a high efficiency screening grid.

Turbulence in tank 23 is accomplished with a water flow rate of 180 pounds pressure of water driven by a 1–2 HP pump. The water flow rate is usually about 5 gallons per minute. Usually a series of six water jets at the top of the conveyer 60 is used to wash the solids.

Of course, various changes, modifications and alterations may be contemplated by those skilled in the art without departing from the intended spirit and scope thereof. As, such, it is intended that the present invention only be limited by the terms of the appended claims.

Having thus described the invention what is claimed and desired to be secured by Letters Patent is:

1. In an apparatus for removing particles from a water influent stream containing fecal matter and solid debris using a drum housing with a rotating endless screen assembly moving in an elliptical path around a drum chamber receiving the water influent and a flushing system on a top surface of the drum housing to carry away debris entrapped by the screen assembly, the improvement comprising:

a) an externally mounted electrically operated air cylinder for powering the endless screen assembly, a pawl and rachet driven by the air cylinder turning a shaft, a drive sprocket attached to the shaft for turning the endless screen assembly;

(b) a tank mounted below a top portion of the endless screen assembly;

(c) the endless screen assembly adapted to lift the fecal matter and solid debris from the water influent stream and depositing the fecal matter and solid debris in the tank;

(d) an air cylinder driven paddle mounted in the tank for agitating the fecal matter and solid debris in the tank so that fecal matter is reduced in particle size and separated from the solid debris;

(e) a drag link dewatering conveyor having a lower portion mounted in the tank for lifting the solid debris out of the tank and depositing it outside the tank;

(f) an air cylinder mounted on an outside portion of the drag link dewatering conveyor for driving a pawl and rachet to incrementally turn the conveyor; and (g) the flushing system is a high pressure washer mounted over the top portion of the endless screen assembly to clean screens of the endless screen assembly.

2. The apparatus according to claim 1 wherein a drag plate is located adjacent the top portion of the endless screen assembly to prevent accumulated solids from falling back into the influent channel.

3. The apparatus according to claim 1 wherein an air cylinder is mounted on an outside surface of the drum housing on each side of the endless screen assembly.

4. The apparatus according to claim 1 wherein there are two drive sprockets, one mounted on a first end and another on a second end of the shaft, the drive sprockets having circumferentially mounted lugs for engaging drive links forming part of the screen assembly.

5. The apparatus according to claim 1 wherein a high pressure turbo washer positioned in the tank enhances agitation of the tank contents.

6. The apparatus according to claim 1 wherein drag links mounted on the dewatering conveyor wipe a filtration grid so that reduced fecal matter can flow through the filtration grid.

7. The apparatus according to claim 1 having a means for pumping ozone into the water to reduce odor.

8. The apparatus according to claim 1 wherein the screen assembly includes means for moving the screen assembly at a speed up to four feet per second.

9. An apparatus for separating fecal material from solid debris in a water influent stream comprising (a) a drum housing containing a rotating endless screen assembly moving in an elliptical path around a drum chamber, a lower portion of the endless screen assembly immersed in the water influent stream, the endless screen assembly moving in response to an externally mounted air cylinder driving a pawl and rachet attached to a shaft turning a drive sprocket;

(b) a tank mounted below a top drop point of the endless screen assembly receiving fecal matter and debris lifted from the water influent stream by the endless screen;

(c) a means for agitating the fecal matter and debris in the tank;

(d) a drag link dewatering conveyor having a lower portion mounted in the tank for lifting solid debris out of the tank and depositing it outside the tank; and (e) an air cylinder mounted on an outside portion of the drag link dewatering conveyor for drawing a pawl and rachet to incrementally move the conveyor.

10. The apparatus according to claim 9 wherein an exit pipe is located in an upper portion of the tank to convey reduced fecal matter and water back to a channel for delivery to a water treatment facility.

11. The apparatus according to claim 9 wherein a pair of air cylinders is mounted outside the drum housing, each air cylinder driving a pawl and rachet, with the rachets turning the shaft.

12. The apparatus according to claim 11 wherein a pair of sprockets having circumferentially mounted lugs are turned by the shaft to move drive links forming a part of the endless screen assembly.

13. The apparatus according to claim 9 wherein the means for agitating the fecal matter and debris in the tank is a paddle powered by an air cylinder.

14. The apparatus according to claim 13 wherein the means for agitating the fecal matter includes a high pressure turbo washer.

* * * * *